(12) United States Patent
Marie

(10) Patent No.: US 10,912,278 B2
(45) Date of Patent: Feb. 9, 2021

(54) DEVICE FOR TRANSLATIONAL DRIVING OF A SCRAPING MEMBER

(71) Applicant: Vincent Marie, Granville (FR)

(72) Inventor: Vincent Marie, Granville (FR)

( * ) Notice: Subject to any disclaimer, the term of this patent is extended or adjusted under 35 U.S.C. 154(b) by 109 days.

(21) Appl. No.: 15/748,441

(22) PCT Filed: Jul. 19, 2016

(86) PCT No.: PCT/FR2016/051862
§ 371 (c)(1),
(2) Date: Jan. 29, 2018

(87) PCT Pub. No.: WO2017/017345
PCT Pub. Date: Feb. 2, 2017

(65) Prior Publication Data
US 2018/0213744 A1 Aug. 2, 2018

(30) Foreign Application Priority Data
Jul. 27, 2015 (FR) ..................................... 15 01602

(51) Int. Cl.
*A01K 1/01* (2006.01)
*F16H 55/30* (2006.01)
*F16H 55/36* (2006.01)

(52) U.S. Cl.
CPC .......... *A01K 1/0132* (2013.01); *A01K 1/0128* (2013.01); *F16H 55/303* (2013.01); *F16H 55/36* (2013.01)

(58) Field of Classification Search
None
See application file for complete search history.

(56) References Cited

U.S. PATENT DOCUMENTS

| 325,539 A | * | 9/1885 | Herman | ................... B66D 1/20 474/164 |
| 2,810,564 A | * | 10/1957 | Zeegers | ................ E21F 13/068 299/34.07 |

(Continued)

FOREIGN PATENT DOCUMENTS

| DE | 102011055216 A1 | 5/2012 |
| EP | 2430913 A1 | 3/2012 |

(Continued)

OTHER PUBLICATIONS

Notice of Allowance dated Feb. 5, 2019 for corresponding U.S. Appl. No. 15/748,435, filed Jan. 29, 2018.

(Continued)

*Primary Examiner* — David J Parsley
(74) *Attorney, Agent, or Firm* — David D. Brush; Westman, Champlin & Koehler, P.A.

(57) ABSTRACT

A device for translating a scraper of droppings covering a corridor of a livestock building. The device includes a chain secured to the scraper, a first sprocket secured to a first end of the chain and a second sprocket secured to a second end of the chain. The first sprocket is rotated by a first motor and the second sprocket is rotated by a second motor in the opposite direction of the first sprocket. A controller controls power supply to the motors and takes states including: a driving state of the scraper in a first direction, wherein the first motor is supplied with power and the power supply of the second motor is cut off; and a driving state of the scraper in a direction opposite to the first direction, wherein the second motor is supplied with power and the power supply of the first motor is cut off.

13 Claims, 3 Drawing Sheets

(56) References Cited

U.S. PATENT DOCUMENTS

| | | | | |
|---|---|---|---|---|
| 4,243,137 | A | * | 1/1981 | Laurenz ................. B65G 25/08 198/748 |
| 4,319,678 | A | * | 3/1982 | Hesler ................... B65G 25/04 198/746 |
| 4,645,476 | A | | 2/1987 | King et al. |
| 4,917,234 | A | | 4/1990 | Seymour |
| 6,446,298 | B1 | * | 9/2002 | Berg, Jr. .............. A01K 1/0132 119/451 |
| 6,948,450 | B2 | * | 9/2005 | Berg .................... A01K 1/0132 119/451 |
| 7,401,575 | B2 | * | 7/2008 | Waybright ........... A01K 1/0132 119/451 |
| 8,435,146 | B2 | | 5/2013 | Chiu |
| 8,720,378 | B2 | * | 5/2014 | Waybright ........... A01K 1/0132 119/451 |
| 8,881,678 | B2 | * | 11/2014 | Eriksson .............. A01K 1/0128 119/14.04 |
| 2004/0261205 | A1 | | 12/2004 | Berg |
| 2008/0153645 | A1 | | 6/2008 | Chiu |

FOREIGN PATENT DOCUMENTS

| | | |
|---|---|---|
| FR | 2343175 A1 | 9/1977 |
| FR | 2991551 A1 | 12/2013 |
| GB | 912908 A | 12/1962 |
| GB | 1329027 A | 9/1973 |

OTHER PUBLICATIONS

French Search Report and Written Opinion dated May 18, 2016 for corresponding French Application No. 1501602, filed Jul. 27, 2015.
French Search Report and Written Opinion dated Jun. 6, 2016 for corresponding French Application No. 1557204 filed Jul. 28, 2015.
Office Action dated Aug. 3, 2018 for corresponding U.S. Appl. No. 15/748,435, filed Jan. 29, 2018.
International Search Report dated Nov. 14, 2016, for corresponding International Application No. PCT/FR2016/051863, filed Jul. 19, 2016.
English translation of the Written Opinion of the International Searching Authority dated Nov. 21, 2016, for corresponding International Application No. PCT/FR2016/051863, filed Jul. 19, 2016.
International Search Report dated Oct. 17, 2016, for corresponding International Application No. PCT/FR2016/051862, filed Jul. 19, 2016.
English translation of the Written Opinion of the International Searching Authority dated Oct. 24, 2016, for corresponding International Application No. PCT/FR2016/051862, filed Jul. 19, 2016.

* cited by examiner

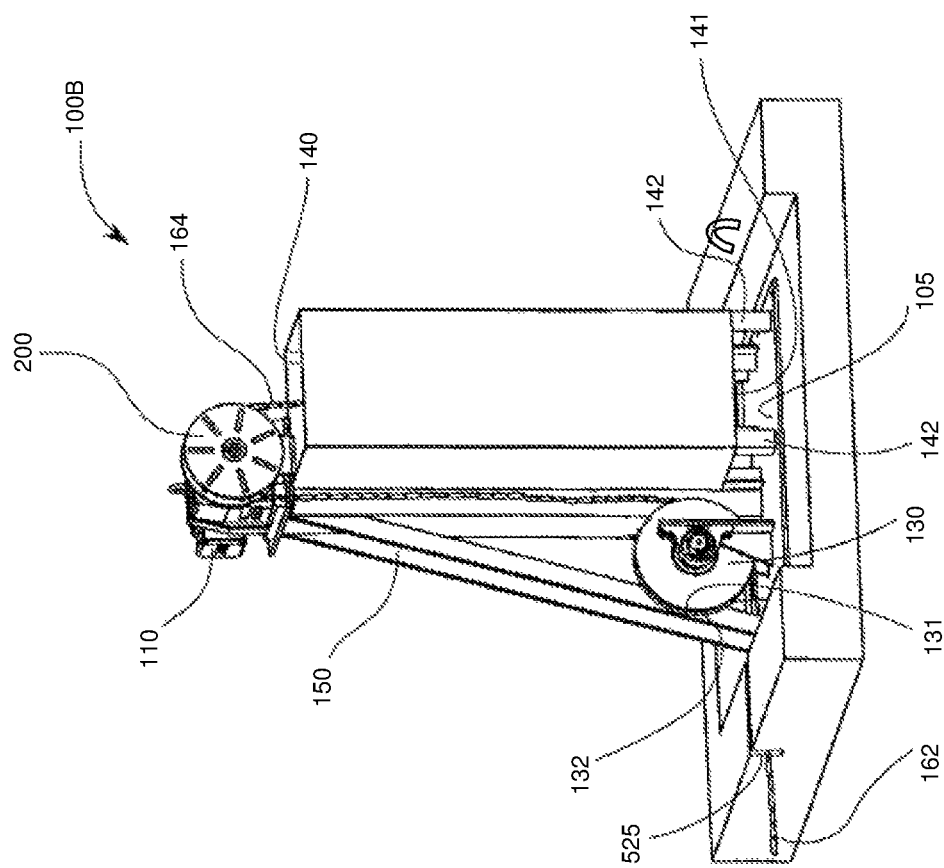
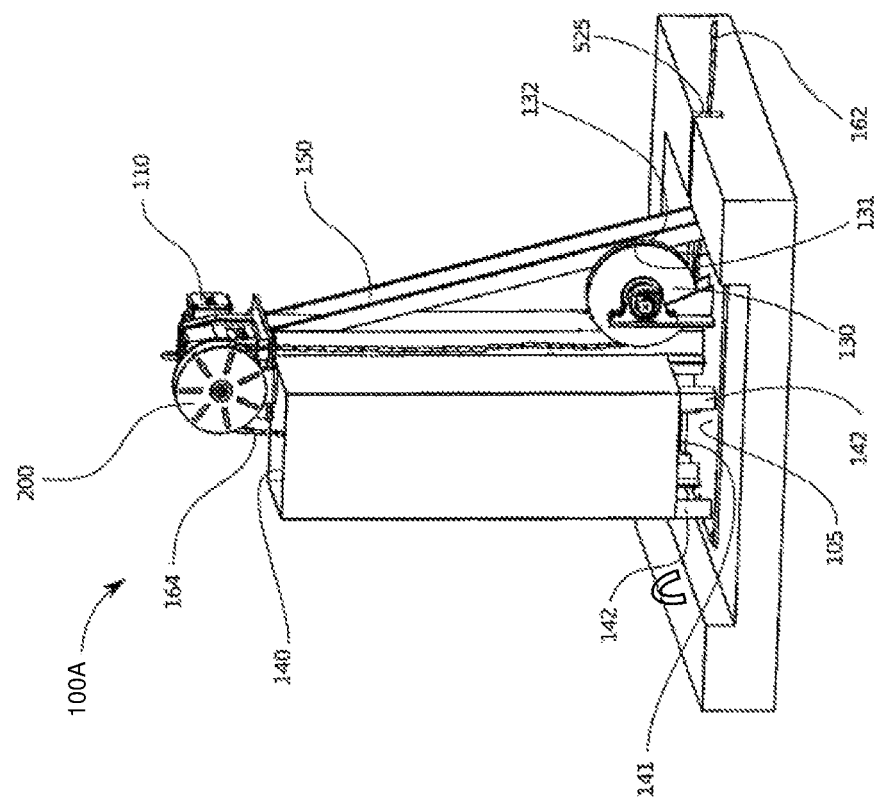

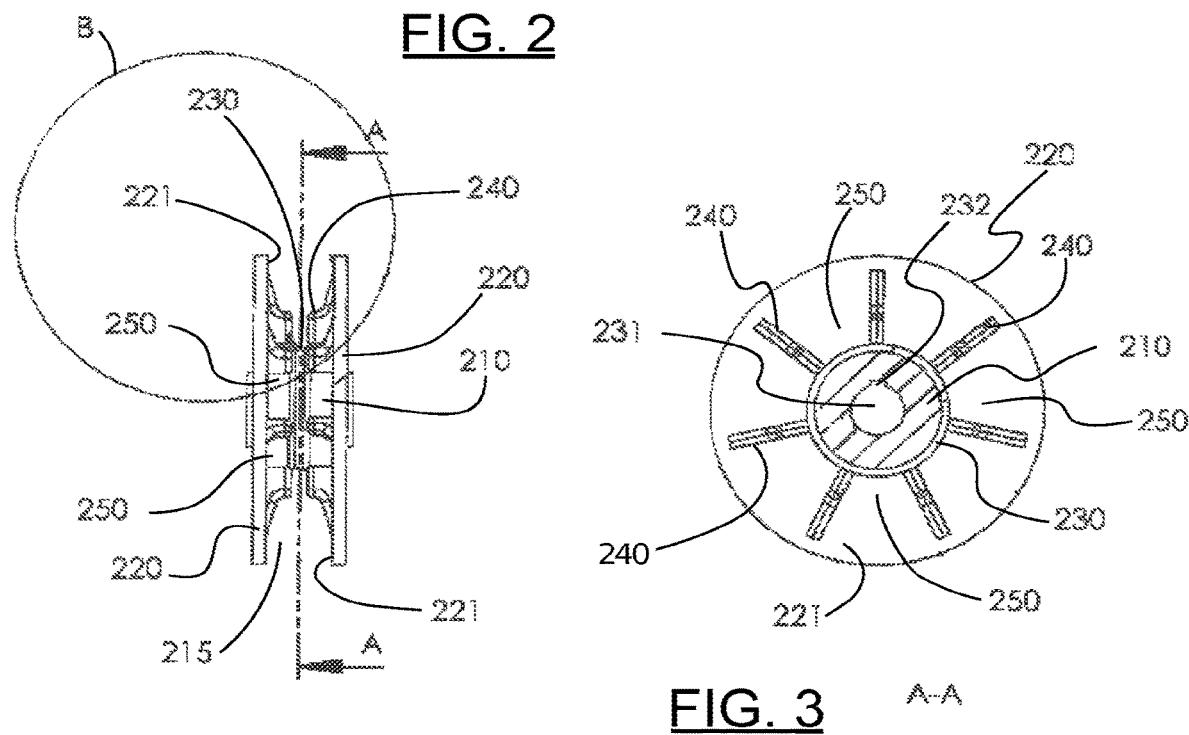
FIG. 2
FIG. 3
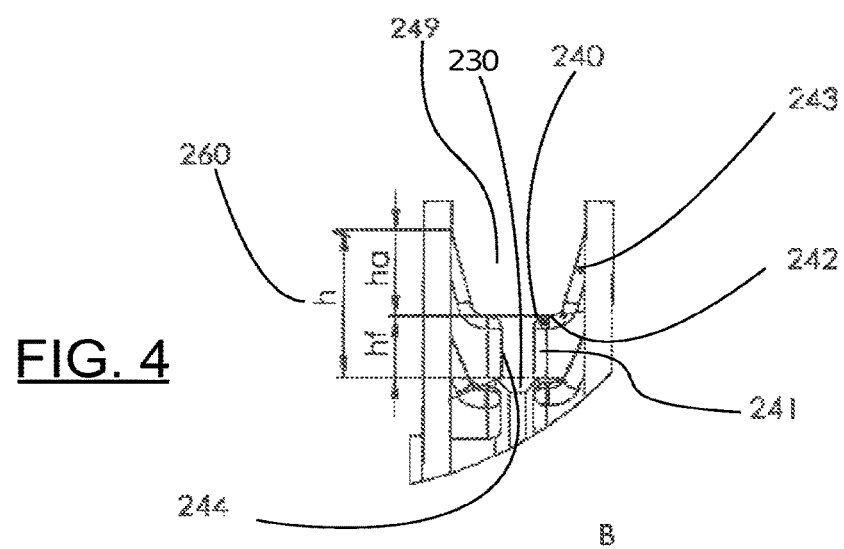
FIG. 4

DEVICE FOR TRANSLATIONAL DRIVING OF A SCRAPING MEMBER

CROSS-REFERENCE TO RELATED APPLICATIONS

This Application is a Section 371 National Stage Application of International Application No. PCT/FR2016/051862, filed Jul. 19, 2016, which is incorporated by reference in its entirety and published as WO 2017/017345 A1 on Feb. 2, 2017, not in English.

1. FIELD OF THE INVENTION

The invention relates to the field of livestock buildings cleaning.

More specifically, the invention relates to a device for translational driving of a scraping member.

The invention is particularly intended to drive a planer intended to push slurry, soft manure, or mulch or thick manure out of the corridors or stabling of a barn.

2. STATE OF THE ART

In a livestock building, frequent cleaning of corridors is part of good working conditions and health and well-being of animals. Indeed, the presence of manure or slurry increases the risk of foot diseases, teat contamination as well as the release of ammonia.

To maintain a relatively clean building and reduce the amount of hazardous gas, the farmer can mechanically clean the lanes with a tractor shovel. This operation is however tedious and time consuming.

In order to free breeders from this task, it has been suggested to install mechanized scrapers to evacuate straw manure or slurry from stables.

Scrapers driven by a hydraulic cylinder are known. Although this drive mode allows high loads to be pushed, but the stroke of the scraper is limited by that of the cylinder. Another disadvantage of this technique is that it can be implemented only in perfectly straight corridors. Another disadvantage of this technique is the high cost of the cylinder.

To limit the costs, scrapers driven by a winch or two winches, using ropes or cables have been suggested. However, such a technique has many shortcomings. The resistance of the ropes or cables in practice limits the length of the installation to 70, respectively 150 linear meters. Another shortcoming of such a technique is that it requires increasing the cleaning frequency to limit the volume of slurry to grow. Another shortcoming of this technique lies in the rapid wear of parts, including ropes or cables, which limits the life of the scraper.

For large buildings, with a corridor that can, for example, reach 230 m, chain scrapers have been suggested, whose planer is towed by a single gear motor. The traction chain forms a closed loop, part of which is under tension, called stretched strand, is hooked to the planer and slides in a groove or guide recess, formed in the floor of the corridor. The geared motor turns alternately in one direction or the other direction depending on the direction of movement of the planer. Document FR 2 991 551 describes such a chain scraper.

A shortcoming of this known technique is that an infrastructure must be provided to guide the soft strand of the chain over the entire length of the building.

Another shortcoming of this technique is that it requires frequent interventions to replace the chain when it relaxes and comes off. In addition, it is necessary to intervene even more frequently when the chain has grown longer with time. To remedy this drawback, the chain needs generally to be fitted with a tensioner. However, the implementation of such a tensioner is complex, especially since it requires fine adjustment of the tension of the chain, and that it is necessary to make regular adjustments of the tension of the chain as and when it relaxes. In addition, providing a tensioner increases the cost of the scraper.

Another shortcoming of this technique is that the chain can twist and come off, which makes the scraper inoperative without maintenance.

3. OBJECTS OF THE INVENTION

The objective of the invention is in particular to remedy the shortcomings of the state of the art mentioned above.

More specifically, the invention aims to provide a translational driving technique of a scraping member that is reliable and requires very little intervention and upkeep as well as maintenance operations.

In particular, in a particular embodiment of the invention, an objective is also to provide such a driving technique that does not require adjustment when the chain is growing longer.

An object of the invention is also to provide such a driving technique that allows the scraping of any type of manure.

Another object of the invention is to provide such a technique that is simple to install, and with reduced cost price.

An object of the invention is also to provide such a technique which is easy to use.

4. SUMMARY OF THE INVENTION

These objectives, as well as others that will appear later are achieved using a device for driving, in a translational motion, a scraping member of at least a portion of the droppings covering a corridor of a livestock building, such as a barn, comprising a chain intended to be secured to the scraping member and actuated by means of a first motor.

According to the invention, such a driving device comprises a first sprocket secured substantially to a first end of the chain and a second sprocket secured substantially to a second end of the chain, the first sprocket being adapted to be rotated by the first motor and the second sprocket being adapted to be rotated by a second motor in the opposite direction of the first sprocket, and means for controlling the power supply to said engines, capable of taking at least two states:

a driving state of said scraping member in a first direction, wherein said first motor is supplied with power and the power supply of said second motor is cut off;

a driving state of said scraping member in a direction opposite to said first direction, wherein said second motor is supplied with power and the power supply of said first motor is cut off.

Thus, in an unprecedented manner, the invention proposes to implement two motors for pulling the planer in one direction or another, by actuating each motor in turn.

The driving device according to the invention is particularly reliable and simple to implement. It also requires very little maintenance.

According to particular embodiments of the invention, the driving device which is the subject of the invention comprises one or more of the following characteristics, according to any operative technical combination.

According to a particular embodiment of the invention, the first motor and the second motor are motors for geared motors.

The use of geared motors rotating at a typical speed for example of 1500 rpm under 50 Hz, can provide a high output torque capable of towing a large load. Moreover, it enables to move the scraping member slowly, which allows for loose stabling of animals in the corridor, without risk of scaring or hurting them.

According to an advantageous embodiment of the invention, a driving device as described above comprises a first guide pulley of the chain, mounted between the first sprocket and the portion of the chain intended to be secured to the scraping member.

The implementation of a pulley keeps the chain close to the ground along the length of the corridor while protecting the motor, which can be placed overhead, from the slurry and/or manure littering the ground.

According to a particular embodiment of the invention, the device comprises a second guide pulley of the chain, mounted between the second sprocket and the portion of the chain intended to be secured to the scraping member.

According to a preferred embodiment of the invention, the first sprocket, the first motor and the first pulley are mounted on a first one-piece bracket.

According to a particular embodiment of the invention, the first one-piece bracket has hooking means for its transport.

The one-piece bracket can be moved easily and be put in place quickly.

According to a particular aspect of the invention, the first pulley is positioned under the first sprocket, substantially perpendicular to the latter.

According to a particular embodiment of the invention, the device comprises a storage box for receiving the first end of the chain when the first sprocket is rotated.

Thus, the soft strand of the chain runs into the storage crate and does not haphazardly pile up on the floor, thereby limiting the space requirements of the driving device on the ground.

According to a preferred aspect of the invention, the first and second sprockets have a plurality of fork-shaped protrusions, each adapted for receiving a link in the chain.

These ranges as possible to wedge the links in the chain facing the edge thereof. Moreover, when the sprocket rotates, at least one of the links of the chain abuts against one of the forks, thereby pulling the chain.

According to a particular aspect of the invention, the axis of the first sprocket and the axis of the shaft of the first motor are horizontal.

According to a particularly advantageous embodiment of the invention, the chain is secured substantially in its middle to the scraping member.

Thus, this system optimizes the length of chain necessary to clean the corridor along its entire length.

In a particular embodiment of the invention, a device as described above comprises means for coupling said sprockets with said motors, which are then able to take at least two positions:
  a first position, in which the first sprocket is engaged with the first motor and the second sprocket is disengaged from the second motor;
  a second position, in which the first sprocket is disengaged from the first motor and the second sprocket is engaged with the second motor.

The use of the verb "include" or "contain» and its conjugate forms does not exclude the presence of other elements or steps different from those set out in a claim. The use of the indefinite article "a" or "an" for an element does not exclude, unless otherwise stated, the presence of a plurality of such elements.

5. LIST OF FIGURES

Other features and advantages of the invention will become evident on reading the following description of one particular embodiment of the invention, given by way of illustrative and non-limiting example only, and with the appended drawings among which:

FIGS. 1A and 1B are perspective of complementary scraper traction modules presented with reference to FIG. 5;

FIG. 2 is a side view of a driving sprocket for a marine chain according to the invention;

FIG. 3 is a sectional view along section A-A of the driving sprocket shown with reference to FIG. 2;

FIG. 4 is a detailed view of a fork of the driving sprocket shown in FIG. 2;

1. DETAILED DESCRIPTION OF THE INVENTION

Figure 5:
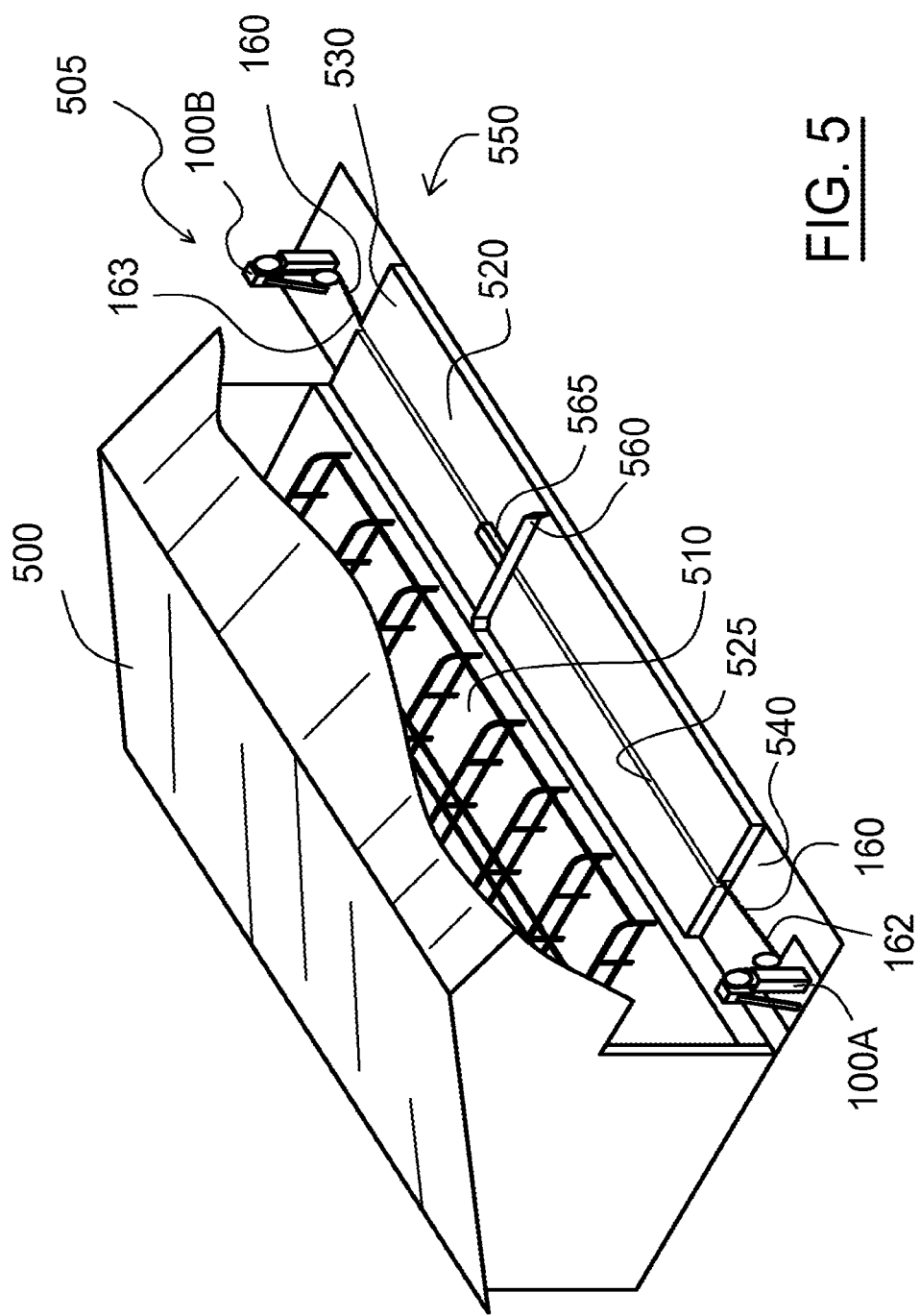
FIG. 5 is a schematic perspective view of a manure and/or slurry scraper.

On FIG. 5, there is illustrated a scraper 550 fitting a barn 500 including a space of stalls 510 and a corridor 520.

The scraper 550 is formed of a planer 560 driven in translation by a device 505, comprising two identical and complementary traction modules 100A and 100B and a chain 160 fixed in its middle to the planer 560.

The traction modules 100A and 100B are arranged at each end of the corridor 520 to clean. One of both traction modules 100A is intended to pull the planer 560 so that it pushes the garbage littering the corridor 520 towards a pit at one end 540 of the corridor, while the other module 100B is adapted to pull and thus bring the planer back to its original parking position 530, located at the other end of the corridor.

During his displacement, the planer 560 is guided by a slider 565 cooperating with a guide recess 525 formed in the floor of the corridor 520. When one of the traction modules 100A or 100B is activated, it tows the planer while putting in tension the part of chain 160 which is called a stretched strand 162, and the other traction module is inactive, allowing the chain part 163 forming a soft strand to run freely.

Thus, whatever the direction of movement of the planer 560, it is pulled by either of the traction modules 100A or 100B.

On FIGS. 1A and 1B, the traction module 100A and traction module 100B, respectively have has-been represented in a-detailed views.

The traction module 100A (and similarly traction module 100B) comprises a chassis 150 mounted on a base 105, supporting at its top a geared motor 110 on the shaft of which is mounted a driving sprocket wheel 200 arranged vertically to an idler pulley 130 and a box 140, also called tray, a chain tub.

The pulley 130 is mounted on the base 105, substantially at ground level and is aligned with the guide recess 525 of the planer, formed in the floor of the corridor 520.

The part of the chain 162, fixed to the planer, comes out of the guide recess 525 of the planer and the pulley 130 returns it to the sprocket 200. At the outlet of the sprocket 200, the chain portion 164 is stored in the box 140.

The pulley 130 has a guide recess 132 shaped to maintain the chain 160 in place at best. This recess 132 has a width substantially greater than that of a link in the chain 160 and a depth substantially equal to half the width of the link.

To ensure that the chain 160 is properly pulled by the traction module 100A, the winding arc of the chain 160 around the sprocket 200 is greater than 90°. Advantageously, this winding arc ranges between 120° and 180° and preferably between 145° and 180°.

Finally, to allow the dirty chain to drip during storage in the tub 140, the bottom 141 of the tub 140 is perforated and raised by feet 142. The perforated bottom 141 allows, in addition, the evacuation of rainwater which otherwise would accumulate in the tub 140 when the traction module 100A is located outside a building.

To pull the planer 560 towards the end 540, a control module supplies electricity to the geared motor of the traction module 100A and switches off the power supply of the geared motor of the traction module 100B, which becomes inactive. Conversely, to return the planer 560 to the parking position 530, the control module cuts off the power supply of the geared motor of the traction module 100A and supplies power to the geared motor of the traction module 100B, which becomes active.

According to one variation, a mechanical coupling, such as a clutch for example, is mounted between the motor shaft of the geared motor 110 and the shaft carrying the sprocket 200. This mechanical coupling can be made temporarily inactive and allows to engage or disengage the sprocket 200 of the geared motor according to whether the traction module carrying it is activated or not. Thus, when the sprocket is disengaged, it becomes idle and lets the chain slip away. On the contrary, when the sprocket is engaged, it rotates at the speed of the shaft of the geared motor and pulls the chain.

On FIGS. 2 and 3, detailed views of a driving sprocket are shown with which the traction modules 100A and 100B are fitted, with reference to FIG. 1, respectively from the side and in sectional view. The sprocket 200 is formed of a cylindrical hub, called a core 210 and two circular flanges 220, welded on the core 210 and delimiting a first, also called main, recess 215.

In this particular embodiment of the invention, the flanges 220 extend beyond said recess over a height 260 of 45 millimetres.

To allow the engagement of the chain 160 by the sprocket 200, the flanges 220 comprise on the inside face 221 teeth 240 of radial orientation, spaced by a regular pitch. Both teeth 240 of the two flanges 220 are arranged facing each other, each pair of teeth forming a fork 249. Each tooth 240 of one of the forks 249 has a similar profile according to the axial orientation of the sprocket, with a substantially constant width having two flanks with substantially parallel faces and rounded edges.

The tooth 240 of the fork 249 shown in detail in FIG. 4 has a height h according to the radial distance between a foot circle corresponding to the diameter $d_f$ of the cylinder forming the core 210 and a tip circle diameter $d_a$ delineating the top of the tooth 240 of the fork 249. This height h of the tooth 240 of the range 249 comprises a protrusion height $h_a$ and a recess height $h_f$.

The hollow height $h_f$ corresponds in the proximal part 244 of the tooth 240 of the fork 249 to a base 241 of constant thickness. At approximately mid-height, the tooth 240 of the fork 249 has a drop 242 in its thickness. This drop 242 is the beginning of a portion 243 corresponding to the projecting height $h_a$ in which the thickness decreases regularly to the distal end of the tooth 240 of the fork 249. In addition, the distal end of the tooth 240 is tangent to the inner face 221 of the flange 220.

The dimensions of the sprocket and the pitch between each tooth 240 of the forks 249 are based on the size of a mesh of the chain used. So, the thickness of the tooth 240 at the base 241 is such that between two teeth 240 facing the fork 249, there remains, on the right of the recess 230, a space of dimension substantially greater than or equal to the section of a link of the chain 160.

To ensure good maintenance of the chain in the sprocket and to prevent the chain from coming off as far as possible, the tooth 240 of the fork 249 further comprises substantially parallel flanks 241 and 242. In addition, the internal faces 221 of the flanges 220 are substantially parallel.

Two successive forks 249 delineate a housing 250 for a link in the chain 160 to drive. The flanks 241 and 242 of the teeth 240 of the forks 249 then serve as a stop for the link of the chain 160 inserted into the housing, transmitting by contact the force produced by the geared motor to the chain 160 which is drawn.

Thanks to the housing thus formed, the chain can twist in the sprocket 200, without coming off and so be dragged farther by the sprocket 200. Similarly, driving is ensured even if the chain is completely stretched, under the effect of traction.

To improve the engagement of the links of the chain in contact on the edge with the sprocket 200, a second recess 230 is formed on the core 210. This secondary recess 230 has a width dimension substantially greater than or equal to the section of a chain link and a depth substantially greater than or equal to half the section of a link.

The cantering of the sprocket 200 on the motor shaft of the geared motor is provided by a central bore 231 formed and machined in the core 210.

This core 210 comprises, in the axial direction of the bore, a groove 232 to maintain the rotation by keying the sprocket 200 on the shaft of the geared motor.

According to one variation, the core 210 of the sprocket 200 extends outside one of the flanges 220, along its axis, in the form of an outer cylindrical portion. This extension of the core makes it possible to equip the traction module with a brake in the form of a belt or a strap acting by friction on this outer cylinder.

According to another variation, the assembly formed of the core 210 and flanges 220 is cast by molding.

The technique described above for making a driving sprocket for a chain can be used in different types of traction equipment or pulleys, for example to form a traction element of a chain of a lifting system or a docking system in a floating structure such as a ship, a platform or other.

Although the invention has been described in connection with several particular embodiments, it is obvious that it is not limited thereto and that it comprises all the technical equivalents of the means described and their combinations if they are within the scope of the invention.

The invention claimed is:

1. A device for driving in a translational motion a scraping member of at least a portion of droppings covering a corridor of a livestock building, comprising:
   a first chain portion having a proximal free end at a first end location and a distal end configured to be secured to the scraping member;
   a second chain portion having a proximal free end at a second end location and a distal end configured to be secured to the scraping member;

a first traction module positioned at the first end location on a first side of the scraping member and comprising:
   a first motor;
   a first sprocket secured substantially to the first chain portion and rotated by the first motor;
   an active state in which the first motor rotates the first sprocket to pull the first chain portion in a first translational direction, toward the first end location; and
   an inactive state;
a second traction module positioned at the second end location on a second, opposite side of the scraping member and comprising:
   a second motor;
   a second sprocket secured substantially to the second chain portion and rotated by the second motor;
   an active state in which the second motor rotates the second sprocket to pull the second chain portion in a second translational direction which is opposite to the first translational direction, toward the second end location; and
   an inactive state; and
a controller, which is connected to operate the first and second traction modules and comprises at least two states:
   a driving state of said scraping member in the first translational direction, in which the controller operates the first traction module in the active state and the second traction module in the inactive state; and
   a driving state of said scraping member in the second translational direction opposite to said first direction, in which the controller operates the first traction module in the inactive state and the second traction module in the active state.

2. The driving device according to the claim 1, wherein said first motor and said second motor are geared motors.

3. The driving device according to claim 1, further comprising a first pulley for guiding said first chain portion, mounted between said first sprocket and a length of the first chain portion to be secured to said scraping member.

4. The driving device according to claim 3, further comprising a second pulley for guiding said second chain portion, mounted between said second sprocket and a length of the second chain portion to be secured to said scraping member.

5. The driving device according to claim 3, wherein said first sprocket, said first motor and said first pulley are mounted on a first one-piece bracket.

6. The driving device according to claim 5, further comprising a hook on said first one-piece bracket.

7. The driving device according to claim 1, a tray positioned at an outlet of the first sprocket to collect the proximal free end and a length of said first chain portion when said first traction module is in the active state, with the first sprocket being rotated by the first motor.

8. The driving device according to claim 1, wherein said sprockets have a plurality of fork-shaped protrusions adapted each for receiving a link of said chain.

9. The driving device according to claim 1, wherein an axis of said first sprocket and an axis of a shaft of said first motor are horizontal.

10. The driving device according to claim 1, wherein said first and second chain portions together form a chain, which is secured substantially in its middle to said scraping member.

11. The driving device according to claim 1, wherein the device further comprises the scraping member.

12. The driving device according to claim 1, wherein:
the first traction module further comprises a first chain tub positioned at an outlet of the first sprocket to collect a length of the first chain portion when the first traction module is in the active state; and
the second traction module further comprises a second chain tub positioned at an outlet of the second sprocket to collect a length of the second chain portion when the second traction module is in the active state.

13. A device for driving in a translational motion a scraping member of at least a portion of droppings covering a corridor of a livestock building, comprising:
a first traction module positioned on a first side of the scraping member and comprising:
   a first chain portion configured to be secured to the scraping member;
   a first motor;
   a first sprocket secured substantially to the first chain portion and rotated by the first motor;
   an active state in which the first motor rotates the first sprocket to pull the first chain portion in a first translational direction;
   an inactive state; and
   a first chain tub positioned at an outlet of the first sprocket to collect a length of the first chain portion when the first traction module is in the active state;
a second traction module positioned on a second, opposite side of the scraping member and comprising:
   a second chain portion configured to be secured to the scraping member;
   a second motor;
   a second sprocket secured substantially to the second chain portion and rotated by the second motor;
   an active state in which the second motor rotates the second sprocket to pull the second chain portion in a second translational direction which is opposite to the first translational direction;
   an inactive state; and
   a second chain tub positioned at an outlet of the second sprocket to collect a length of the second chain portion when the second traction module is in the active state;
a controller, which is connected to operate the first and second traction modules and comprises at least two states:
   a driving state of said scraping member in the first translational direction, in which the controller operates the first traction module in the active state and the second traction module in the inactive state; and
   a driving state of said scraping member in the second translational direction opposite to said first direction, in which the controller operates the first traction module in the inactive state and the second traction module in the active state.

\* \* \* \* \*